United States Patent
Bowen et al.

(10) Patent No.: US 9,202,191 B2
(45) Date of Patent: Dec. 1, 2015

(54) SYSTEM AND METHOD FOR REMOTE ACQUISITION AND DELIVERY OF GOODS

(75) Inventors: Mark Baron Bowen, Los Angeles, CA (US); Michael Hays, Indian Wells, CA (US)

(73) Assignee: Consumeron, LLC, Los Angeles, CA (US)

( * ) Notice: Subject to any disclaimer, the term of this patent is extended or adjusted under 35 U.S.C. 154(b) by 141 days.

(21) Appl. No.: 13/568,216

(22) Filed: Aug. 7, 2012

(65) Prior Publication Data
US 2012/0303488 A1    Nov. 29, 2012

Related U.S. Application Data

(62) Division of application No. 12/711,867, filed on Feb. 24, 2010, now Pat. No. 8,244,594.

(60) Provisional application No. 61/237,128, filed on Aug. 26, 2009.

(51) Int. Cl.
G06Q 30/00 (2012.01)
G06Q 10/08 (2012.01)
G06Q 30/06 (2012.01)

(52) U.S. Cl.
CPC .......... *G06Q 10/08* (2013.01); *G06Q 30/0617* (2013.01); *G06Q 30/0623* (2013.01); *Y02B 60/50* (2013.01)

(58) Field of Classification Search
CPC .......... G06Q 30/0601; G06Q 30/0635; G06Q 30/0633; G06Q 30/0641
USPC ................................. 705/26.1, 27.1
See application file for complete search history.

(56) References Cited

U.S. PATENT DOCUMENTS 6,026,376 A    2/2000    Kenney
6,032,130 A    2/2000    Alloul et al.
(Continued)

FOREIGN PATENT DOCUMENTS

JP    2002094621    3/2002
JP    2003132278    5/2003
(Continued)

OTHER PUBLICATIONS

Lawrence et al., "Personalization of Supermarket Product Recommendations", Data Mining and Knowledge Discovery, vol. 5, pp. 11-21, 2001.

*Primary Examiner* — Courtney Stopp
(74) *Attorney, Agent, or Firm* — Diederiks & Whitelaw, PLC

(57) ABSTRACT

A system and method for remote acquisition and delivery of goods includes a server in communication with customer computers, such as through a user interface via the internet. The server can store customer information including billing information, and may include a real-time video processor. A mobile delivery system in communication with the server includes an energy efficient vehicle, a real-time video device, a global positioning system, a communication device and a printer. In use, a customer communicates with a mobile delivery agent via the real-time video device and the communication device to remotely acquire a product. Once acquired, the delivery agent delivers the product to a designated delivery location. The real-time video device can be utilized during the entire transaction. The system preferably includes a processor for optimizing system efficiencies, including selecting a delivery agent based on the product, pick-up location and delivery site.

16 Claims, 3 Drawing Sheets

(56) References Cited

U.S. PATENT DOCUMENTS

| | | | |
|---|---|---|---|
| 6,070,149 A | 5/2000 | Tavor et al. | |
| 6,381,583 B1 | 4/2002 | Kenney | |
| 6,604,681 B1 | 8/2003 | Burke et al. | |
| 6,837,436 B2 | 1/2005 | Swartz et al. | |
| 7,040,541 B2 | 5/2006 | Swartz et al. | |
| 7,063,263 B2 | 6/2006 | Swartz et al. | |
| 7,124,098 B2 | 10/2006 | Hopson et al. | |
| 7,130,814 B1 | 10/2006 | Szabo et al. | |
| 7,195,157 B2 | 3/2007 | Swartz et al. | |
| 7,206,647 B2 | 4/2007 | Kumar | |
| 7,251,621 B1 | 7/2007 | Weng | |
| 7,309,015 B2 | 12/2007 | Frantz et al. | |
| 7,505,929 B2 | 3/2009 | Angert et al. | |
| 7,515,914 B2 | 4/2009 | Herrod et al. | |
| 7,627,502 B2 | 12/2009 | Cheng et al. | |
| 7,680,694 B2 | 3/2010 | Glazer et al. | |
| 7,775,431 B2 | 8/2010 | Skaaksrud et al. | |
| 7,797,204 B2 | 9/2010 | Balent | |
| 7,954,710 B1 | 6/2011 | Lee | |
| 8,224,707 B1 | 7/2012 | Smith et al. | |
| 8,321,298 B2 | 11/2012 | Chou et al. | |
| 2001/0044751 A1 | 11/2001 | Pugliese, III et al. | |
| 2002/0072974 A1 | 6/2002 | Pugliese et al. | |
| 2003/0115104 A1 | 6/2003 | Smith et al. | |
| 2003/0125963 A1 | 7/2003 | Haken | |
| 2004/0199435 A1 | 10/2004 | Abrams et al. | |
| 2005/0004844 A1 | 1/2005 | Attia | |
| 2005/0015311 A1 | 1/2005 | Frantz et al. | |
| 2005/0228719 A1 | 10/2005 | Roberts et al. | |
| 2006/0020522 A1 | 1/2006 | Pratt | |
| 2006/0111955 A1* | 5/2006 | Winter et al. | 705/8 |
| 2006/0259369 A1 | 11/2006 | Bongrazio et al. | |
| 2007/0088617 A1 | 4/2007 | Yang | |
| 2007/0100704 A1 | 5/2007 | Liu et al. | |
| 2007/0208629 A1 | 9/2007 | Jung et al. | |
| 2008/0086386 A1* | 4/2008 | Bell | 705/26 |
| 2008/0093460 A1 | 4/2008 | Frantz et al. | |
| 2008/0222009 A1 | 9/2008 | Maranhao | |
| 2008/0235038 A1 | 9/2008 | Szamel | |
| 2008/0313052 A1 | 12/2008 | Otto et al. | |
| 2009/0094324 A1 | 4/2009 | Le Chevalier | |
| 2009/0099972 A1 | 4/2009 | Angert et al. | |
| 2009/0157486 A1 | 6/2009 | Gross | |
| 2009/0192892 A1 | 7/2009 | Cason | |
| 2009/0265248 A1 | 10/2009 | Walker | |
| 2010/0142758 A1 | 6/2010 | Pinhas et al. | |
| 2010/0185514 A1 | 7/2010 | Glazer et al. | |
| 2010/0280918 A1 | 11/2010 | Balent | |
| 2010/0293106 A1 | 11/2010 | Rhoads et al. | |
| 2011/0022499 A1 | 1/2011 | Hogan | |
| 2011/0035299 A1 | 2/2011 | Casey | |
| 2011/0055046 A1 | 3/2011 | Bowen et al. | |
| 2011/0145051 A1 | 6/2011 | Paradise et al. | |
| 2011/0145093 A1 | 6/2011 | Paradise et al. | |
| 2011/0258086 A1 | 10/2011 | Stein | |
| 2012/0233032 A1 | 9/2012 | Calman et al. | |
| 2012/0265651 A1 | 10/2012 | Ephraim | |

FOREIGN PATENT DOCUMENTS

| | | |
|---|---|---|
| JP | 2003533777 | 11/2003 |
| JP | 2006004096 | 1/2006 |
| JP | 2006082981 | 3/2006 |
| JP | 2007304633 | 11/2007 |
| JP | 2008217831 | 9/2008 |

\* cited by examiner

SYSTEM AND METHOD FOR REMOTE ACQUISITION AND DELIVERY OF GOODS

CROSS-REFERENCE TO RELATED APPLICATIONS

The present invention represents a divisional application of U.S. patent application Ser. No. 12/711,867 entitled "System and Method for Remote Acquisition and Delivery of Goods" filed Feb. 24, 2010 which claims the benefit of U.S. Provisional Patent Application Ser. No. 61/237,128 entitled "System and Method for Remote Shopping and Delivery" filed Aug. 26, 2009, which is hereby incorporated by reference in its entirety.

BACKGROUND OF THE INVENTION

1. Field of the Invention

The present invention pertains to customer shopping and, more particularly, to a system and method for remote acquisition and delivery of goods.

2. Discussion of the Prior Art

Electronic commerce via the internet is rapidly becoming a standard method by which customers purchase goods remotely for delivery to a location of the customer's choice. However, there are many potential problems associated with ordering goods over the internet. For example, most internet retailers rely on third-party services, such as UPS and Federal Express, to deliver the products purchased on their web sites. From an environmental standpoint, delivering select, goods purchased over the internet to individual customers using conventional methods creates a large carbon footprint, and is often not cost effective. For example, when various goods are transported from one or more warehouses across the country to individual customers, rather than to a single store from where the items can be purchased, certain inefficiencies are realized.

Perhaps more important, many customers are opposed to internet shopping. For instance, customers who are particular about style, quality or actual function, may wish to further view or otherwise examine an item before purchasing. Often, a picture may not be available for the item or the picture will be inadequate to accurately depict the item. For this reason, the customer may simply refuse to purchase over the internet or perhaps may purchase an item and then return the same after the item is later examined. Obviously, this purchasing scenario is also inefficient.

Additionally, there currently exists no good solution for an individual to receive immediate delivery of desired goods. For example, if an elderly person is in pain in the middle of the night and is not able to drive to a pharmacy to obtain medication, there is generally no delivery service readily available to acquire the medication and deliver it to the person's home. Further, in regard to public safety, if an individual is intoxicated and it is illegal for him to do an errand, there generally exists no cost effective solution for immediate remote purchase and delivery of goods.

Based on at least these reasons, there is seen to be a need in the art for a remote acquisition and delivery system which provides a customer with detailed information needed to make an informed purchase or acquisition, and which, provides rapid delivery of the goods without creating a large carbon footprint.

SUMMARY OF THE INVENTION

The present invention is directed to a system and method for remote acquisition and delivery of goods. The system includes a server in communication with customer computers or devices via a website on the internet or through a network. The server stores customer information including billing information, and may preferably includes a real-time video processor. A mobile delivery agent system in communication with the server includes an energy efficient vehicle, a real-time video device, a global positioning system (GPS), a communication device and a printer.

In use, a customer contacts a service provider through the remote acquisition and delivery system and registers to use the system. Once registered, the user provides the service provider with information regarding the type of product desired and the shopping or acquisition location from which the user desires to purchase or otherwise obtain the product. A mobile delivery agent in close proximity to the shopping location will receive the request for purchase or acquisition from the system, and the delivery agent will proceed to the shopping location. The UPS preferably tracks the delivery agent, and provides navigational information to the delivery agent. The real-time video device is utilized to deliver real-time video of the delivery agent on the way to the location, as well as video captured during execution of a purchase process. The customer is allowed to interact with the delivery agent to inspect the product remotely using the real-time video device and the communications device. Once a purchase or acquisition is approved, the delivery agent acquires the product on behalf of the customer and delivers the product to a designated delivery location. The printer is utilized to produce an invoice and any other transaction documents for delivery to the customer, or documents are mailed to the customer by standard mail or electronic mail. The system preferably includes one or more processors for optimizing efficiencies of the system and calculating the most efficient use of delivery agents based on the shopping location and the delivery site.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF THE PREFERRED EMBODIMENT

Figure 1:
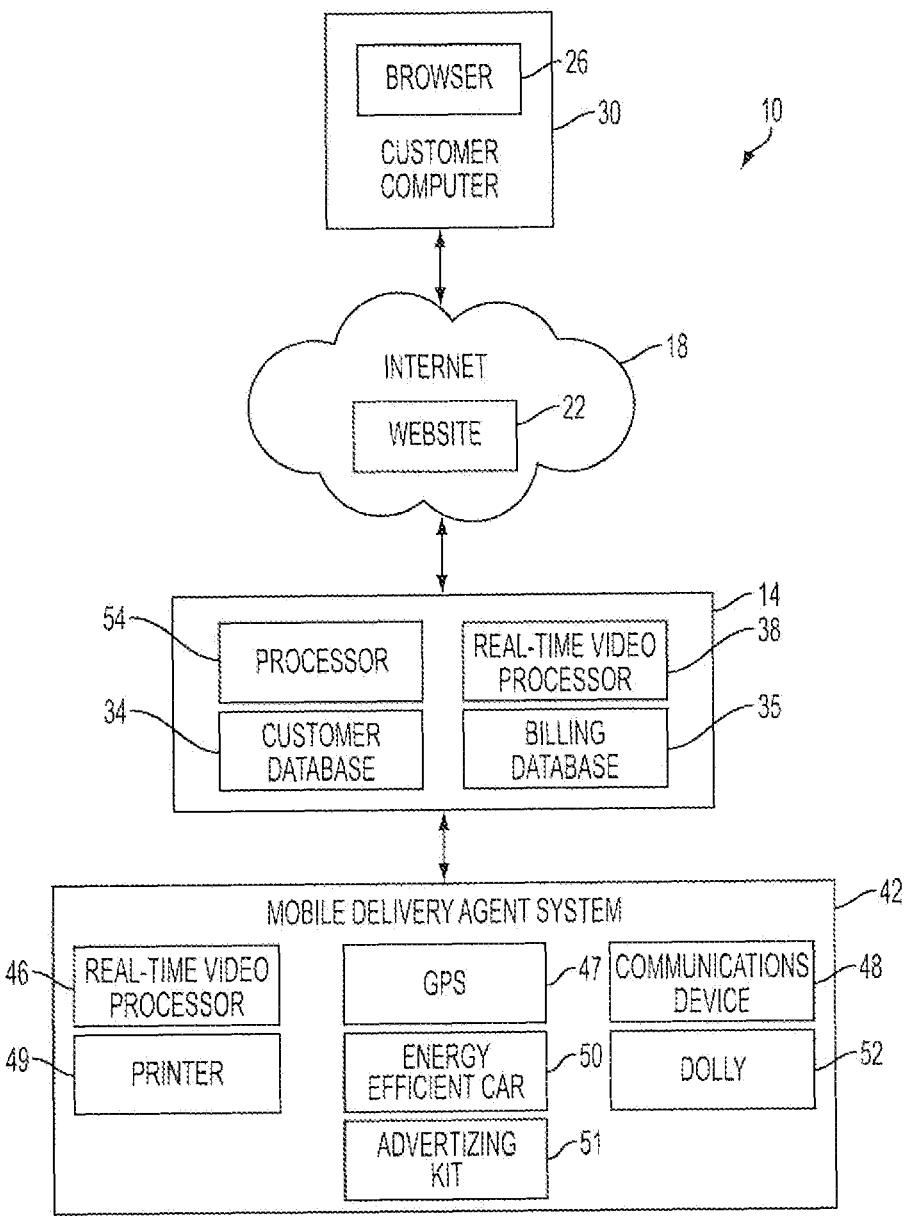
FIG. 1 is a schematic diagram of the remote acquisition and delivery system of the present invention.

With reference to FIG. 1, a remote acquisition and delivery system constructed in accordance with the present invention is indicated at 10. A services provider is equipped with at least one server 14 in communication with a wide area network (WAN), such as the internet 18. A user accesses a user interface 22, such as a website or cable television network screen through WAN or internet 18 via a customer computer 30. It should be understood that customer computer 30 can be any type of device for communication with user interface 22, such as a personal computer including a browser 26, a television or a cell phone or other mobile device. For example, the user interface 22 may be installed as an application on the user's mobile device, such as the user's iPhone™, Blackberry or other PDA. Preferably, system 10 makes use of emerging "blended services" technologies including integrated voice, video and data features which are always "on", giving users the ability to move from one function to another during a communication session. This blended services technology may be in the form of a digital television which allows for software to be utilized for viewing entertainment and internet applications.

A plurality of databases are stored within server 14. For example, customer data is stored in a customer database 34 on server 14, and billing information is stored in billing database 35. A real-time video processor 38 is also preferably associated with server 14. Server 14 is in contact with a plurality of mobile delivery agent systems, such as indicated at 42. Each mobile system 42 preferably includes a real-time video device 46, a global positioning system (GPS) 47, a communications system or device 48 and a printer 49. GPS 47 is preferably utilized to track a mobile delivery agent, as well as provide navigational information to the delivery agent as will be discussed in more detail below. Communications system 48 preferably includes an on-board computer and transceiver system for wirelessly accessing a wide area network or virtual private network (VPN) and system servers. In the preferred embodiment of the invention, mobile system 42 also includes an energy efficient vehicle, such as an electric or hybrid car or other vehicle 50 as the means for transporting the system. Although each of the devices 46-49 can be separate, in a preferred embodiment one or more of devices 46-49 are incorporated into vehicle 50, or are in the form of one or more portable devices. In one embodiment, delivery agents will carry a battery pack(s) to supply power to devices 46-49. Such a battery pack(s) are preferably incorporated into belts or into the uniform of a delivery agent.

Each vehicle 50 preferably includes an outdoor advertising kit 51 enabling the services provider to selectively advertise for themselves, or others. Additionally, vehicles 50 can be outfitted with other tools or accessories, such as a dolly 52 for delivering large purchases to a customer. In one embodiment, a plurality of different sized vehicles 50 are provided, allowing for more flexibility in delivering oversized or large numbers of products/goods. For example, the customer will have the option of utilizing a delivery agent having a mini-vehicle, a mid-sized van, a large van or an extra large moving van. Additionally, each vehicle 50 in communication with server 14 is preferably equipped with a kill switch which may be remotely activated by the services provider of system 10. Optionally, vehicle 50 is provided with at least one hide-away seat which is utilized to transport a customer(s) and/or the customer's pet, such as when a customer wishes to accompany a delivery agent to view a product in person or when a customer needs to take his or her pet to the vet or boarding house. Further, a secure pick-up service for customers with accompanying membership cards may be provided for a fee, similar to an AAA membership for road side assistance.

Figure 2:
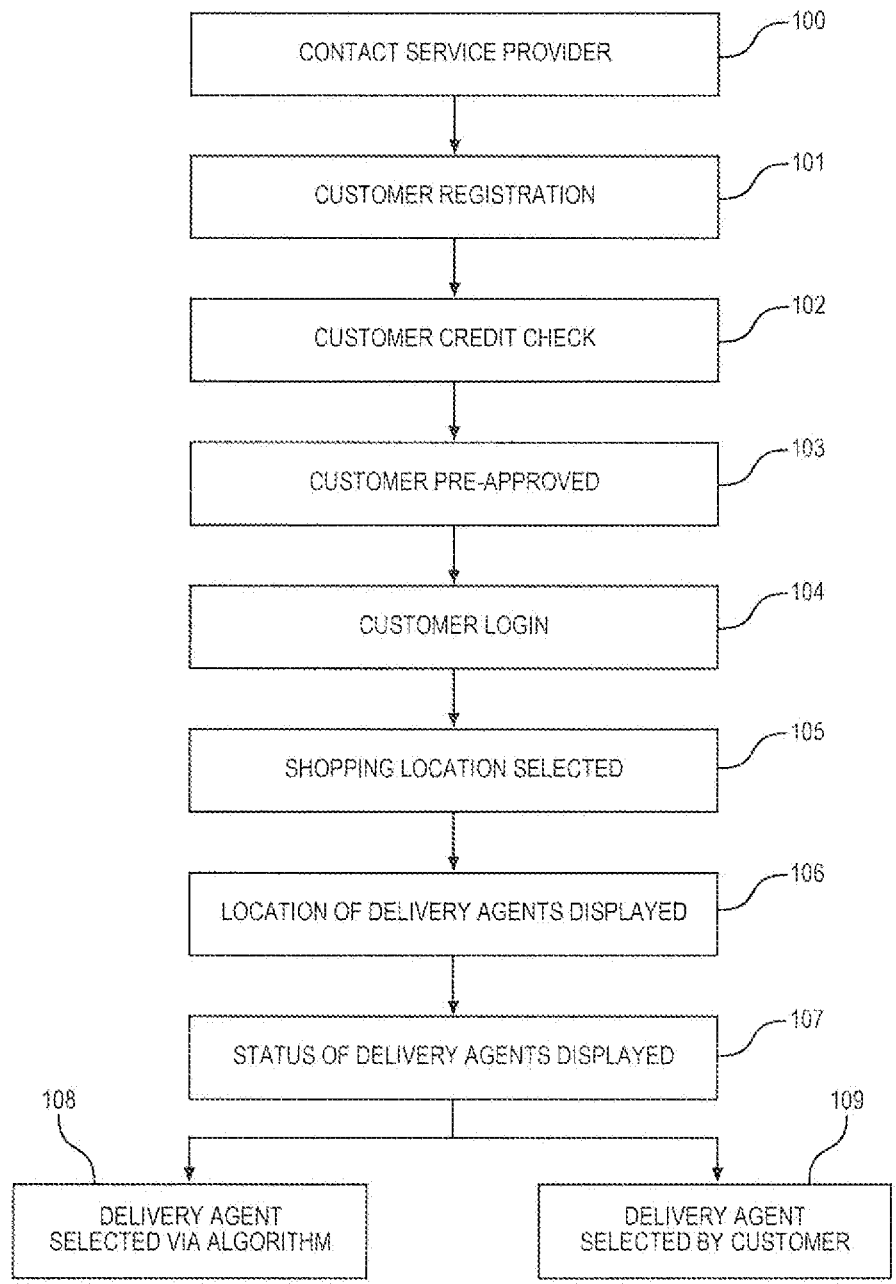
FIG. 2 is a flow chart depicting steps involved in a preferred method of the present invention.

A method for utilizing system 10 will now be discussed with reference to FIG. 2. Initially, if a customer wishes to contact the services provider for system 10, the customer registers with the services provider by first contacting the service provide through user interface 22 and WAN 18, as indicated at 100. If the customer is a new user, the customer then registers with the services provider at 101 and the customer information is stored in customer database 34. Optionally, the customer registers by other means, such as mailing in an application. Registration preferably includes gathering billing information from the customer, such as a credit card number or other desired billing method, as well as indicating one or more delivery addresses. In one embodiment, information on the location of a customer is transmitted from a customer's smart phone or UPS enabled phone or device to system 10. In this way, the delivery address of a customer can be obtained without the need for the customer or the service provider to physically type in the delivery location information. Preferably, a credit check of the customer is conducted at 102 prior to the customer being approved as a registered customer, and the customer is pre-approved for a particular credit amount at step 103. When a customer requests services, a pre-authorization check is conducted, such as by charging an amount to a customer's designated charge account, in order to verify that funds are available. In a preferred embodiment, customer database 34 additional stores customer history of use data, which may be utilized in conjunction with a loyalty program similar to a frequent-flyer type program. The customer database 34 may also store a customer's recurring order as set up and managed by the customer. The customer database 34 may also track a customer's previous purchase information which may be helpful in allowing the system to suggest a repeated order or a recurring order to the customer. The customer database 34 may keep such profile information or historical information which may be utilized to suggest purchases to a customer.

Preferably, a membership card or other information is sent to the customer upon registration. The customer then logs into system 10 via website 22 at step 104 utilizing a user name and password generated during registration. The customer is next provided with information regarding the location of a plurality of delivery agents. More specifically, the customer may enter in the area he or she is interested in obtaining services through utilizing a user interface, such as by entering his or her local zip code or the address of a store where a desired product is being sold at step 105, using an input device (e.g., keyboard) of user interface 22, Next, information regarding the location and status of delivery agents in the desired area is displayed on a display screen of user interface 22 at step 106, and the user has the option of selecting the delivery agent of his or her choice. For example, a map of the local area where the customer is located appears showing the location of one or more delivery agents in close proximity to the shopping and/or delivery location. A user may be able to zoom in and zoom out on this map. Indicia for the delivery agents are preferably color coded to indicate the status of the delivery agent as indicated at step 107. For example, a green dot on the map indicates a delivery agent who is available, a red dot indicates a delivery agent who is currently filling an order, and a yellow dot indicates a delivery agent who is on standby, such as a large delivery van driver who may work from a home base, or a vehicle that is recharging or refueling. In one embodiment, the customer has access to information regarding the type of vehicle each delivery agent is driving, and may base his or her selection on the type of vehicle desired for the pickup/delivery, or may select a particular delivery agent based on the customer's preference for the particular delivery agent. In one embodiment, delivery agent profiles are available for customers to review. Such profiles may include, for example, a picture of the delivery agent with a short biography, a list of any particular areas of expertise, other customers' remarks, ratings or feedback regarding the delivery agent, or the like.

Preferably, the user specifies the exact location from which the selected delivery agent is to purchase or otherwise acquire the product, such as a retail store location. Alternatively, system 10 calculates the closest location from which to make the purchase based on the selected delivery agent's current location and the location of the customer. Such calculation may be done manually, utilizing GPS 47, utilizing processor 54 or through some other means. Preferably, store locations are selected in a manner which optimizes efficiencies and reduces vehicle operating costs by selecting store locations that reduce travel time for the selected delivery agent both to the store and during delivery to the customer.

In one embodiment, if no delivery agent is in the immediate area selected, the map will zoom out to encompass a larger area until one or more delivery agents appear on the map. As set forth above, in a first embodiment, a customer selects the delivery agent based on a variety of factors such as location, availability, or preference for a particular agent, as indicated at step 108. Alternatively, a processor 54 including a decision algorithm is utilized to select a delivery agent for the customer, as indicated at step 109. For example, a selection of a delivery agent may be made to enable a delivery agent to obtain goods for more than one customer in a single trip or to minimize the total number of miles traveled by the plurality of delivery agents. Alternatively, a delivery agent manager may select the most appropriate delivery agent for the user, given the desired area and status of delivery agents in the desired area.

Figure 3:
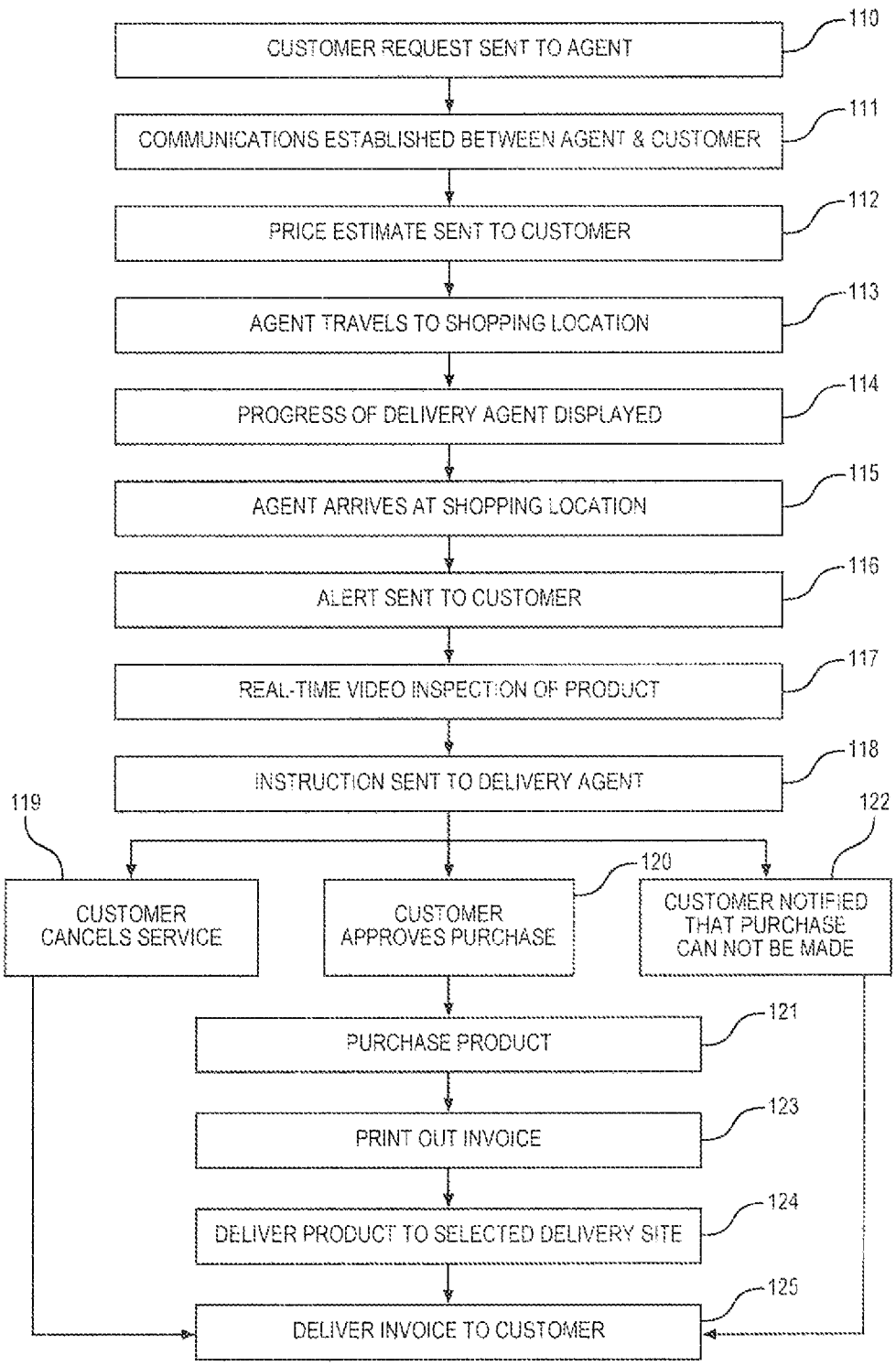
FIG. 3 is a flow chart depicting additional steps involved in a preferred method of the present invention.

As shown in FIG. 3, once the desired delivery agent is selected at steps 108 or 109, a customer shopping or acquisition request and profile is sent to the delivery agent at step 110, and a communications link is established between the customer and the selected delivery agent at step 111, such as through a telephone or internet connection. Preferably, the customer account information is sent to a communications device 48 in the form of a portable Internet device or an onboard display unit located in the agent's vehicle 50. The portable internet device or onboard display unit may be voice, data and video enabled and utilize internet protocol. The request for a particular product is sent to the selected delivery agent, along with the desired shopping location. The customer profile preferably includes the credit limit available for purchases. The customer's profile may also include information related to a customer's order history.

In one embodiment, the customer first finds information on a product and location of a store or conducts cost-comparisons of products utilizing an internet search engine or cost comparison website. A website tool allows the user to select the delivery services of system 10, wherein system 10 gathers information from the results of the internet search engine or website in order to generate a request for services or shopping request. In a preferred embodiment, widgets are provided for other websites, such as classified ads or internet retailers, for ease in data transmission to server 14 and individual delivery agents. For example, a customer will simply click on a widget indicating the service provider of system 10 on a website in order to view the closest vehicle 50 to the shopping location depicted on the user interface 22 being viewed by the customer. The pick-up destination and map are automatically captured and transmitted to a selected delivery agent's vehicle, along with an approximate cost estimate for the customer. In addition, system 10 preferably allows a user to rate retailers and/or sellers and post comments. In one embodiment, user interface 22 provides the customer with targeted advertising related to the particular geographic region of the customer delivery and/or pick-up location. Additionally, retail sales alerts and value alerts for locations of interest are preferably displayed on user interface 22. In one embodiment, system 10 enables customers to post classified ads for used goods, wherein delivery services associated with system 10 can be utilized by customers to shop for the used goods remotely and have the used goods delivered to a desired delivery site as will be explained in more detail below.

A purchase order or acquisition request is scheduled for a particular date and/or time, or is requested as needed by the customer. In a preferred embodiment, once an order is scheduled, a price estimate of services is sent to the customer for approval before proceeding with the transaction as indicated at step 112. Such an estimate is generated, for example, based on the estimated driving time for the delivery agent and a service charge for purchase and delivery of a desired product. Optionally, a user may choose to share a trip, in which case multiple customers will utilize the same delivery agent to purchase products at the same location. In this embodiment, the status of the delivery agents posted on user interface 22 includes the shopping location the delivery agent is traveling to, as well as the time the delivery agent will be at the shopping location. With this information, customers within the same geographic region may choose to utilize the same delivery agent. Although the method of the present invention discussed in more detail below only references a single customer, it should be understood that any additional customer that selects the same agent will also send an acquisition request to system 10; wherein the agent will electronically transfer an image of the requested goods using real-time video device 46, in the same manner as described with respect to the first customer. The agent may then acquire the second set of goods for the second customer and make a second delivery trip to a delivery location specified by the second customer. In some situations, an agent may be able to obtain goods for multiple customers from one shopping location in a single trip. In this situation, greater efficiencies are realized and discounts may be offered to customers who participate in the shared pick-up event. In one embodiment, a customer may be able to pay a premium for a faster delivery. In such a scenario, a selection of a delivery agent may be made to accommodate the customer who has paid the premium instead of to maximize the overall efficiency of the delivery agents for multiple customers.

Once a store location is selected, the selected delivery agent travels to the store location as indicated at step 113, and finds the desired product to be acquired. Ideally, real-time video device 46 is utilized to provide a streaming "street view" for the customer's entertainment and to show the progress of the delivery agent as indicated at 114. Additionally, GPS 47 is utilized with digital mapping technology to dynamically update the customer as to the location of the delivery agent. In one embodiment, once the delivery agent arrives at the selected location as indicated at 115, the delivery agent activates a wearable real-time video device 46, which provides the customer with a real-time view of the selected location as seen by the delivery agent. In one embodiment, system 10 sends short message service (sms) alerts to the customer or initiate voice communication with the customer when a delivery agent is leaving vehicle 50 to enter a location so that the customer can multi-task without worrying about the status of the delivery agent, as indicated at 116. The delivery agent then enters the shopping location and identifies the product of interest. The delivery agent then communicates to the customer that the product has been identified, and the customer has the option of inspecting the product in real-time at 117. If the customer chooses to inspect the product, the customer will communicate instructions to the delivery agent at 118, and the delivery agent will utilize real-time video device 46 to transmit real-time data to customer computer 30. In a preferred embodiment, instructions are in the form of several pre-approved commands. For example, the customer may request that the delivery agent zoom-in on a particular feature, zoom out, pan right or pan left. Such pre-approved commands will minimize miscommunications between the customer and the delivery agent.

Next, the customer either approves or rejects acquisition of the inspected product. If the product is rejected, the customer has the choice of inspecting another product or terminating the service. Once the service is terminated, fees for the services provided are calculated as will be discussed in more detail below. If the customer requests further shopping, the delivery agent will move to other similar products or may travel to another location in search of a satisfactory product. Of course, the customer may choose to terminate the acquisition services at any time, as indicated at 119. If the product is approved at 120, the delivery agent will purchase or otherwise acquire the product on behalf of the customer at 121 and deliver the product based on the delivery options specified in the customer's profile, or amended delivery instructions provided by the customer at the beginning of a particular shopping request or at some time during a particular shopping request. In one embodiment, the customer may select a curbside drop-off of goods, or may request "white glove" delivery, in which case the delivery agent will deliver the product directly to the customer's door or desired physical location. Further, the location of the customer, and thus the delivery location, may be obtained directly from the customer's GPS enabled device or smart phone as previously discussed. Additionally, the customer request may include a request for product pickup. For example, upon delivery of goods to the customer, the delivery agent may pick up recyclable products (e.g., cans, bottles, consumer electronics, etc.), which the delivery agent will transport to a recycling facility.

If the customer is not qualified for the amount of the desired purchase, or if the delivery agent cannot complete the transaction for any reason, the customer is notified that the acquisition cannot be made as indicated at 122. It should be understood that this step can be provided at any time during the service period whenever it is established that the purchase price is outside of the pre-approved credit limit. Alternatively, the customer has the option of paying the retailer or seller directly, in which case the customer will only be billed for the pick-up and delivery services provided. For payment by proxy, the delivery agent may utilize printer 49 to produce a pre-authorization purchasing document including billing information which allows the delivery agent to pay at pick-up. If pre-purchased by the customer, the delivery agent obtains a receipt showing proof of pre-payment by the customer. In one example, if a customer wishes a delivery agent to pick-up a used good(s), such as from a yard sale, the delivery agent debits the customer's credit card for the amount of the purchase price, and upon successfully receiving funds from the customer account, utilizes printer 49 to print out a check as legal tender for the goods to be purchased.

In a preferred embodiment, printer 49 is also utilized to print out an invoice for the amount of time the delivery agent was engaged, distance traveled, purchased product and shopping services rendered, as indicated at 123. The product is then delivered along with the invoice and any other paperwork (e.g., receipts) to the customer or the selected delivery site as indicated at 124 and 125. Preferably, the invoice is packaged and attached to the purchased product. In one embodiment, the invoice includes a map having the route traveled during the shopping request and delivery highlighted, with an accompanying time history. If no product is purchased and no delivery is made, an invoice for services rendered may be generated utilizing billing database 35 and information provided by the delivery agent, with the invoice being sent to the customer either electronically (e.g., via a designated email address) or through standard mail delivery methods. The services rendered may be charged directly to a designated customer credit card, or utilizing some other designated electronic payment method. In one embodiment of the invention, each delivery agent has his or her own designated checking account and/or credit card which is utilized to purchase the desired goods and the customer is billed for services and product purchased upon delivery of the product to the customer.

Real-time video device 46 is preferably utilized throughout the transaction to show the location of the delivery agent as the agent is driving to a desired purchase location, to show the product at the purchase location, and to verify delivery of the product to the customer at the designated delivery location. Preferably, video footage is stored on server 14 and can be accessed for delivery agent evaluation, for liability and public safety purposes, for delivery agent history or dispute resolution purposes, for example. However, in another embodiment, historic customer information is utilized for rapid request orders. More specifically, a customer can place an order through server 14, and server 14 will send the order to a deliver agent without the need for the customer to select a delivery agent or communicate with the delivery agent. This feature can be particularly useful when a customer wishes to obtain previously ordered items such as prescription medications or groceries. In this case, the customer may be sent an alert through customer computer 30 when the delivery agent is nearing the delivery location.

Based on the above, it should be understood that the present invention provides a system for remote acquisition and delivery of goods that supplies a customer with the detailed information needed to make an informed purchase or acquisition remotely, and provides rapid same-day delivery of goods without creating a large carbon footprint. In one embodiment, system 10 calculates the reduction in carbon emissions from utilizing the service, or from selecting a particular delivery agent. It is contemplated that various retailers may work in conjunction with the services provider of system 10 to promote the use of the environmentally friendly services of the provider through displays indicating that the retails work with the service provider. In one embodiment, for example, a registered customer may opt-in for liquidation alerts from participating retailers. Additionally, participating retailers may provide in-house gear for staff or delivery agents, such as glasses with an embedded real-time video processor 46 and a communications device 48 to enable staff or delivery agents entering the retail establishments to communicate with a customer. Alternatively, participating retailers may provide point-of-view (POV) cameras within the retail establishment which are connected to the internet and can be accessed by customers through system 10 so that the customers may view products within a store prior to engaging a mobile delivery agent.

In one exemplary embodiment, a customer generates an e-shopping "wish" list for desired products utilizing system 10. The e-shopping list can be created manually by a user typing in his or her request into a user interface (e.g. keyboard) of computer 30. Alternatively, the e-shopping list can be created utilizing an image and data capture device, such as a camera, and transferring the data to server 14 for processing. More specifically, a customer may travel to a retail establishment and, either utilizing in-house gear provided by the retail establishment or utilizing person equipment, such as a camera or bar code scanning device, record which products the customer may be interested in obtaining at a future time. For each product on the list, the customer sends information regarding the product such as pictures, video, instructions, recipes, specifications, ingredients, where manufactured, etc. to server 14. This e-shopping list is then made available to the customer upon logging into system 10. Preferably, a selected delivery agent may retrieve the customer's e-shopping list and check items off the list as they are obtained utilizing communications device 48 or some other device communicating with server 14. In this way, a customer can view the updates to their e-shopping list in real-time through their computer's connection to server 14. Additionally, data or images captured by real-time video processor 46, or the customer's own equipment (e.g., camera), may be utilized by server 14 to generate product reviews on the particular product of interest or to check the internet for digital coupons associated with the product. The product reviews may be accessed by the customer through system 10, and the digital coupons may be viewed and accessed by the customer or the selected delivery agent and used in the purchase of the desired product. Such coupons may be printed by the selected delivery agent utilizing printer 49, for example.

Although described with reference to preferred embodiments of the invention, it should be readily understood that various changes and/or modifications can be made to the invention without departing from the spirit thereof. For instance, although discussed in the context of a customer who wishes to purchase a product, it should be understood that system 10 may be utilized to schedule both pick-ups and delivery of any type of goods, including free goods. In one embodiment, system 10 will be utilized to arrange for disposal services for a customer, such as trash removal or hazardous materials removal. For example, a customer may wish for a delivery agent to purchase and deliver a new water heater, but may also wish for the delivery agent to carry away the old water heater or arrange for a third-party pickup of the water heater. In this situation, the delivery agent may arrange for a local trash service to perform a one-time pick-up of the old water heater. In another example, a customer may utilize a delivery agent in a different country or city in order to shop remotely for a desired product, and the delivery agent may arrange for a third party delivery service to transport the product to the customer. In another example, a delivery agent might be engaged to view a real estate listing and provide real-time video remote viewing of the property. Further, the steps for the methods of remote acquisition and delivery of goods described herein do not necessarily need to be in the order in which they are presented above. In general, the invention is only intended to be limited by the scope of the following claims.

We claim:

1. A system for remote acquisition and delivery of one or more goods based on an acquisition request from a customer through an interactive interface for processing the acquisition request comprising:
   a customer computer having a user interface;
   at least one server in communication with a wide area network;
   a plurality of mobile delivery agent systems in communication with the at least one server, each of the plurality of delivery agent systems being configured for use with a respective purchasing and delivery agent for a shopping event and including:
      a real-time video device configured to send one or more images in real-time to the customer from the respective agent, wherein the real-time video device is configured to enable the customer to be provided with progress information via real-time imaging of the one or more images from the respective agent through the customer computer during performance of the acquisition request, including viewing the one or more goods from a pick-up site for the one or more goods;
      a communications device configured to establish direct communication between the customer and the respective agent to enable the customer to provide a communicated approval for the agent to immediately purchase the one or more goods viewed by the customer in connection with completing the acquisition request:
      a global positioning system configured to provide location data to the at least one server; and
      a selectable widget for a website configured to retrieve data submitted by at least one of the mobile delivery agent systems to the at least one server and generate a view of the one or more goods at the pick-up site associated with a third party vendor together with at least the data submitted to the at least one server by the mobile delivery agent system.

2. The system of claim 1, wherein each of the plurality of delivery agent systems further comprises a mobile printer for providing the customer a receipt for the acquisition request.

3. The system of claim 1, wherein the at least one server includes a customer database for storing customer information.

4. The system of claim 1, wherein the at least one server includes a processor adapted to select one of the plurality of agents for the acquisition request based, at least in part, on current location information of each of the respective agents relative to the pick-up site at the time the acquisition request is entered.

5. The system of claim 1, wherein each of the plurality of mobile delivery agent systems further includes an energy efficient, hybrid or electric vehicle, wherein the real-time video device and the communications device are configured to be linked to the customer computer from within the energy efficient, hybrid or electric vehicle.

6. The system of claim 1, wherein the at least one server is adapted to receive the acquisition request from the customer over the wide area network.

7. The system of claim 1, wherein the acquisition request specifies a delivery site and the system is further configured with at least one server including a processor adapted to select one of the plurality of delivery agents for the acquisition request based, at least in part, on the location of each delivery agent relative to the delivery site and present the server selection to the customer.

8. The system of claim 1, wherein the at least one server includes a processor adapted to select one of the plurality of agents to complete the acquisition request based, at least in part, on location information of the respective agents relative to the shopping event at the time the acquisition request is entered and availability status of the respective agent.

9. The system of claim 1, further comprising a global positioning system in communication with the at least one server, with the global positioning system providing location information to the customer on the respective agent.

10. The system of claim 1, wherein the customer computer having the user interface is configured to display the respective agent's location and real-time images.

11. A system for remote acquisition and delivery of one or more goods based on an acquisition request from a customer through an interactive interface for processing the acquisition request comprising:
    a plurality of mobile delivery agent systems configured with at least a global positioning system providing location information to at least one server;
    a selectable widget for a third party vendor website configured to retrieve data submitted by the plurality of mobile delivery agent systems to the at least one server and to generate a view of a pick-up site associated with the third party vendor together with at least the data submitted to the at least one server by the plurality of mobile delivery agent systems including current locations of the mobile delivery agent systems;

a display for displaying to the customer at least the generated view;

an input configured to receive the acquisition request and a selection made by the customer of one of the plurality of delivery agent systems representing delivery agents;

communication means for processing the acquisition request from the customer and establishing direct communication between the customer and the selected delivery agent during both the acquisition and delivery of the one or more goods to the customer; and a real-time video means for sending at least one image to the customer through the communication means and transmitting real-time data to the display for the customer to view the one or more goods and the respective agent's progress during performance of the acquisition request.

12. The system of claim 11, wherein the real-time video means displays the agent's view of the one or more goods.

13. The system of claim 11, wherein the display is configured to present the location of the agent during performance of the acquisition request, including viewing data from the agent at a shopping and pick-up site, data from a shopping event, and travel data from the agent during travel to a designated delivery site.

14. A system for remote acquisition and delivery of one or more goods based on an acquisition request from a customer through an interactive interface for processing the acquisition request comprising:

a customer computer having a user interface and configured to establish a local communication link between the customer and a mobile agent for purposes of the acquisition request;

a mobile agent system configured for use by the mobile agent for a shopping event established based on the acquisition request, said mobile agent system including:

means for sending one or more images in real-time to the customer from the mobile agent through the local communication link and providing the customer with progress information via real-time imaging of the one or more images from the mobile agent to the customer computer during performance of the acquisition request, including viewing the one or more goods from a pick-up site for the one or more goods during the shopping event;

communication means, establishing direct communication between the customer and the mobile agent, for communicating approval by the customer to the mobile agent in connection with completing the acquisition request;

a global positioning system configured to provide location data through the local communication link; and a selectable widget for a vendor website configured to retrieve data submitted by at least one of the mobile delivery agent systems through the local communication link and generate a view of the one or more goods at the pick-up site associated with a third party vendor together with at least the data submitted through the local communication link by the mobile delivery agent system.

15. The system of claim 14, wherein the computer interface is configured to display the generated view including the respective delivery agent's progress during performance of the acquisition request, including viewing data from the mobile agent at the pick-up site, data from the shopping event, and travel data from the mobile agent during travel to a designated delivery site.

16. The system of claim 14, wherein the widget is further configured to establish the local communication link between the customer and the mobile agent for the acquisition request of the one or more goods.

* * * * *